United States Patent [19]

Cain

[11] Patent Number: 4,523,330
[45] Date of Patent: Jun. 11, 1985

[54] BANKING SYSTEM AND METHOD

[75] Inventor: John D. Cain, Kitchener, Canada

[73] Assignee: NCR Canada Ltd - NCR Canada Ltee, Mississauga, Canada

[21] Appl. No.: 452,563

[22] Filed: Dec. 23, 1982

[51] Int. Cl.³ .............................................. G06K 9/20
[52] U.S. Cl. ...................................... 382/7; 235/379; 382/48
[58] Field of Search ................. 382/7, 48, 59; 235/379

[56] References Cited

U.S. PATENT DOCUMENTS

| | | | |
|---|---|---|---|
| 3,949,363 | 4/1976 | Holm | 340/146.3 D |
| 3,987,412 | 10/1976 | Morrin | 340/146.3 AE |
| 3,988,571 | 10/1976 | Blair et al. | 235/61.9 R |
| 4,027,142 | 5/1977 | Paup et al. | 235/61.9 R |
| 4,088,981 | 5/1978 | Gott | 382/59 |
| 4,201,978 | 5/1980 | Nally | 340/146.3 C |
| 4,205,780 | 6/1980 | Burns et al. | 235/454 |
| 4,259,661 | 3/1981 | Todd | 340/146.3 AQ |
| 4,264,808 | 4/1981 | Owens et al. | 235/379 |
| 4,280,143 | 7/1981 | Judd | 358/260 |
| 4,288,782 | 9/1981 | Bader et al. | 340/146.3 Q |
| 4,318,082 | 3/1982 | King | 382/48 |
| 4,404,649 | 9/1983 | Nunley et al. | 235/379 |

FOREIGN PATENT DOCUMENTS 0076972  4/1983  European Pat. Off. .

Primary Examiner—Leo H. Boudreau
Attorney, Agent, or Firm—Albert L. Sessler, Jr.; Elmer Wargo

[57] ABSTRACT

A method and apparatus for processing documents comprising a unit for reading machine-readable data and for generating image data from the documents as the documents are moved along a track in operative relationship therewith. The unit also includes recognition circuitry receiving the image data and a portion of the machine-readable data to produce recognition data along with confidence level data relative to the recognition data for each document. A control processor is used for storing the machine-readable data, image data, recognition data, and confidence level data by an identification number which is assigned thereto by the control processor for each corresponding document. A second control processor is used for examining the confidence level data for each document to thereby select the machine-readable data, recognition data, and image data for a document having predetermined confidence level data and for transferring the data selected to a terminal to be displayed on an associated display to enable an operator to effect data completion on a keyboard associated with the terminal. After data completion, an encode and sort unit is used to further process the documents.

10 Claims, 7 Drawing Figures

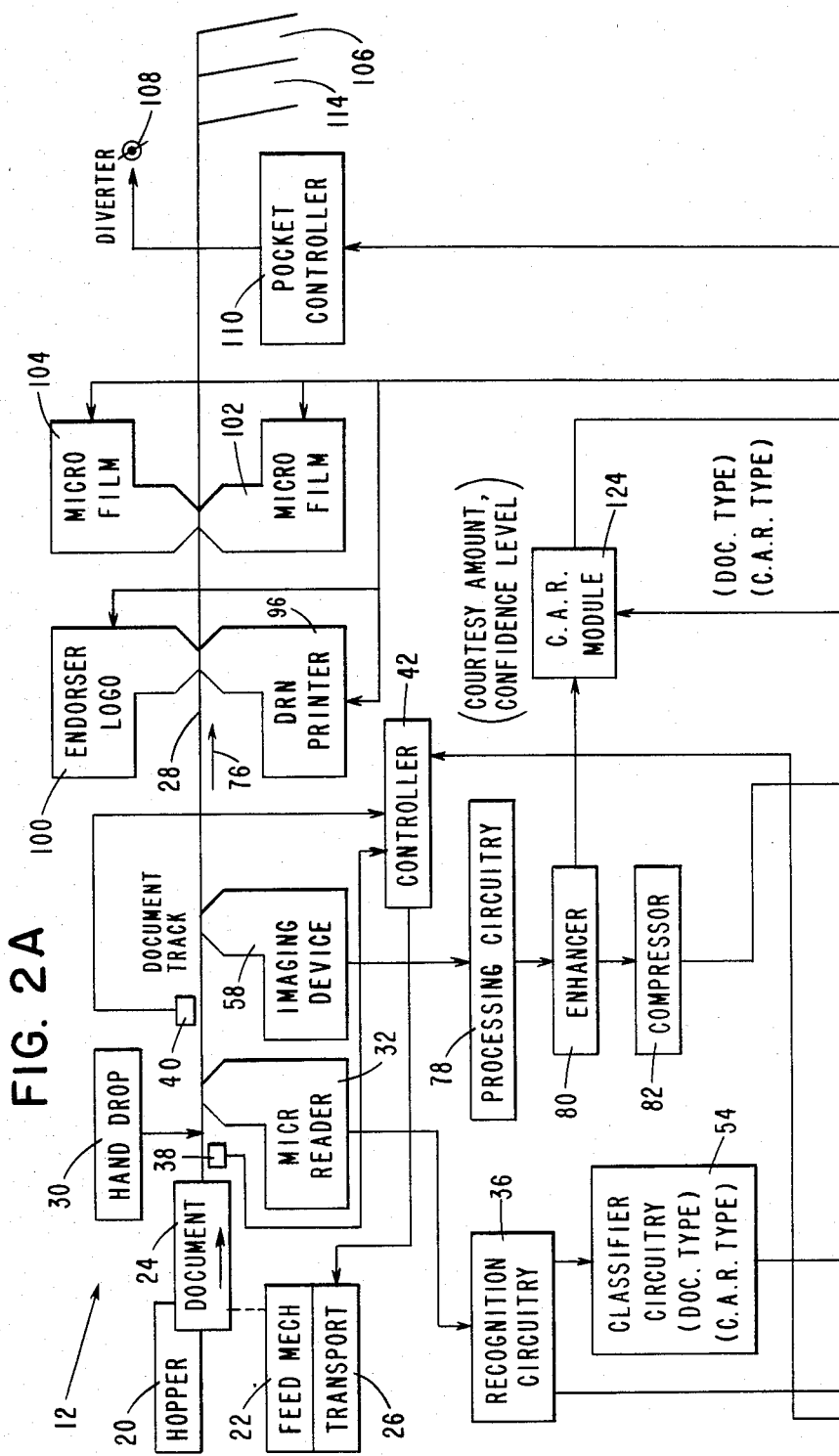

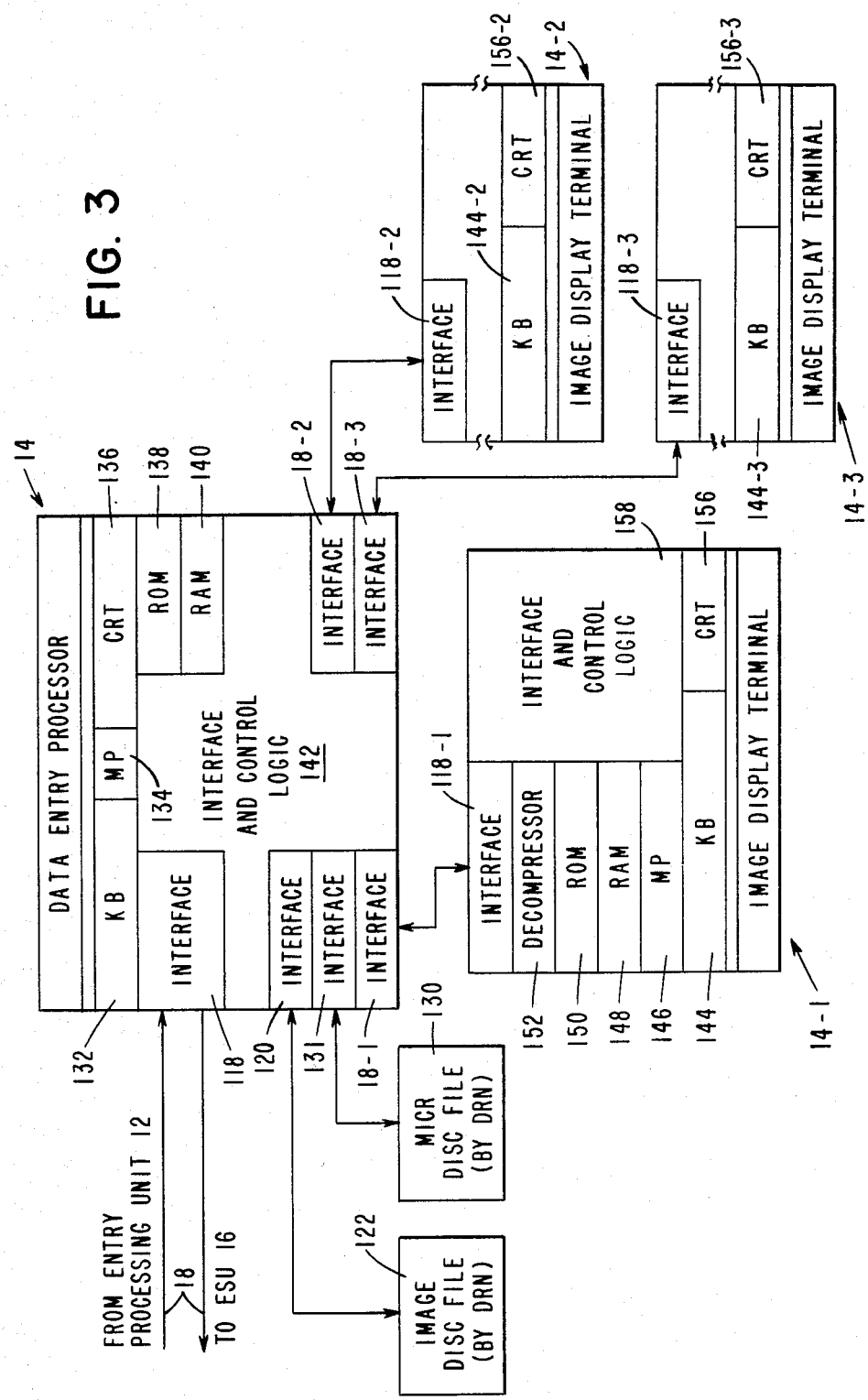

BANKING SYSTEM AND METHOD

BACKGROUND OF THE INVENTION

This invention relates to a banking method and system for processing documents, and more particularly, the system includes an entry processing unit, basically, for capturing mechanically, certain data on the documents, a data entry processor for generally completing data which was not mechanically captured at the entry processing unit, and an encode and sort unit, using the data obtained from the entry processing unit and the data entry processor, to encode certain data on the documents and to sort them in accordance with predetermined instructions.

The documents such as checks, for example, which are used currently in banking systems have certain data such as individual account numbers, bank routing numbers etc., printed thereon in magnetic ink, for example, and this data is commonly referred to as magnetic ink character recognition or MICR data. When a document is received at a bank for processing, the monetary amount of the document is written, for example, by a customer in plain or non-magnetic ink. Part of the routine processing of a document such as a check requires that the monetary amount of the check be printed thereon in magnetic ink, thereby making it part of the MICR data on the check to be used for subsequent mechanical processing.

Generally, such typical documents including checks are processed in "batches" including about 200-300 documents in each batch. Certain accounting or banking operations are performed on a "batch" of such documents.

Some prior art banking systems are shown in U.S. Pat. Nos. 3,949,363, 4,205,780, and 4,264,808, for example.

SUMMARY OF THE INVENTION

In one aspect of this invention, the invention comprises: a unit for reading machine-readable data and for generating image data from said documents as said documents are moved along a track in operative relationship therewith; said unit also including recognition means receiving said image data and a portion of said machine-readable data to produce recognition data along with confidence level data relative to said recognition data for each said document; and control means for storing said machine-readable data, image data, recognition data, and confidence level data by an identification number which is assigned thereto by said control means for each corresponding said document.

In another aspect of this invention, the invention comprises: a first unit for reading machine-readable data and for generating image data from said documents as said documents are moved along a track in operative relationship therewith; said first unit also including recognition means receiving said image data and a portion of said machine-readable data to produce recognition data along with confidence level data relative to said recognition data for each said document; and control means for storing said machine-readable data, image data, recognition data, and confidence level data by an identification number which is assigned thereto by said control means for each corresponding said document; and also comprises a second unit, comprising: a first storage means for storing said machine-readable data, recognition data and confidence level data by the associated identification number; a second storage means for storing said image data by the associated said identification number; at least one terminal used for data completion and having a keyboard and a display; and second control means for examining said confidence level data for each said document to thereby select said machine-readable data, recognition data, and image data for a document having predetermined confidence level data and for transferring said data selected to said terminal to be displayed on said display to enable an operator to effect data completion on said keyboard.

In yet another aspect of this invention, the invention comprises a method of processing documents comprising the steps of: (a) moving a document along a track; (b) reading machine-readable data from said document as it is moved along said track; (c) producing image data from said document as it is moved along said track; (d) utilizing a portion of said machine-readable data in conjunction with said image data to facilitate machine recognizing of predetermined data on said document and for producing confidence level data associated with said predetermined data; (e) assigning an identification number to said machine-readable data, image data, predetermined data and associated confidence level data for each associated said document, and storing all said data mentioned in this step according to the said identification number assigned to each corresponding said document.

Some of the advantages of the present invention are as follows:

1. An increased output of documents being processed is obtained.
2. Documents may continue to be processed in batches as is currently being done.
3. The apparatus and method of this invention are cost effective to implement, when compared to prior-art approaches.
4. Encoding of the documents is effected only after the data is correct from a proofing operation.

These advantages and others will be more readily understood in connection with the following specification, claims and drawing.

BRIEF DESCRIPTION OF THE DRAWING

FIGS. 2A and 2B taken together, form a schematic diagram, in block form, showing more details of the EPU shown in FIG. 1;

FIG. 3 is a schematic diagram, in block form, showing more details of the DEP and its associated terminals shown in FIG. 1;

DETAILED DESCRIPTION OF THE INVENTION

Figure 1:
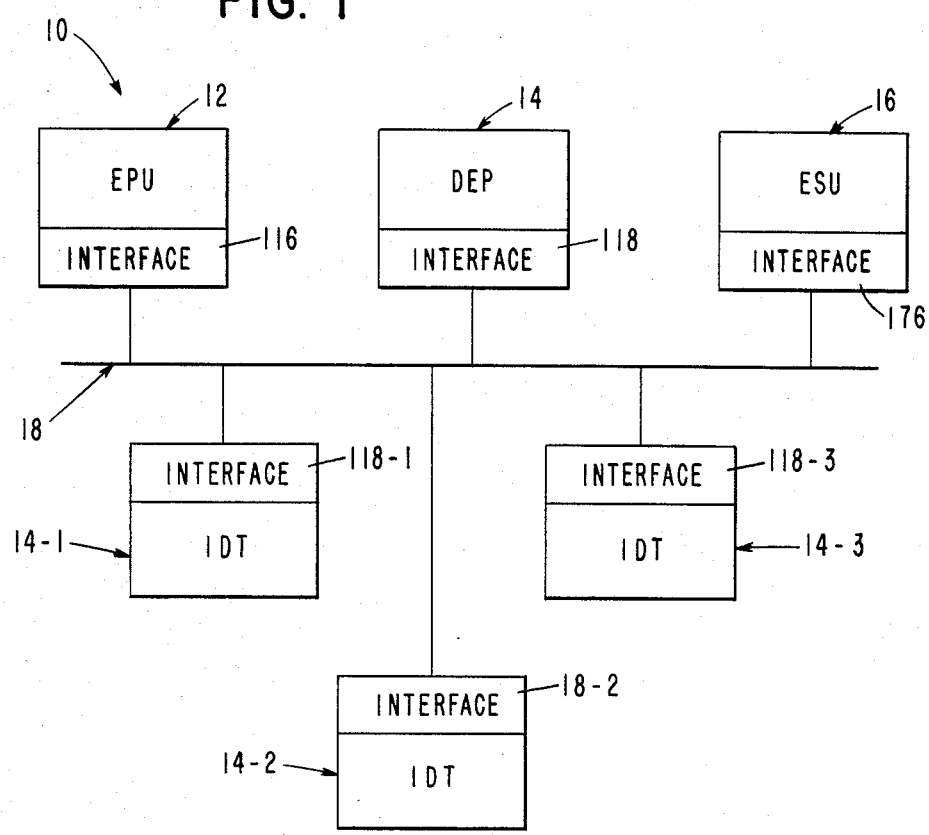
FIG. 1 is a general schematic diagram, in block form, of a preferred embodiment of this invention, showing the entry processing unit (EPU), data entry processor (DEP) with its associated image display terminals (IDT) and an encode and sort unit (ESU) which are all interconnected by a local area network.

FIG. 1 is a general schematic diagram, in block form, of a preferred embodiment of this invention which shows various elements of a banking system which is designated generally as system 10. The system 10 includes an entry processing unit (EPU) 12, a data entry processor (DEP) 14 with its associated image display terminals (IDT) 14-1, 14-2, and 14-3, and an encode and sort unit (ESU) 16 which are interconnected by a conventional, local-area network 18.

In general, the function of the EPU 12 is to receive documents such as checks and deposit slips, for example, and mechanically read certain data from the documents which are processed in batches of about 200–300 documents per batch. The DEP 14, along with the IDTs 14-1, 14-2, and 14-3, in general, perform the function of using the output of the EPU and completing the data not mechanically read at the EPU 12, correcting mis-read data where necessary, and performing certain banking procedures such as proof and reconciliation, for example. The ESU 16, in general, receives the completed data for a batch of documents from the DEP 14 and encodes the corresponding courtesy or monetary amount for a document on the associated document such as a check or deposit slip as it moves through the ESU 16. Certain other functions such as stamping, endorsing and microfilming are performed at the ESU 16 prior to having the documents sorted into various sorting pockets according to the bank's sorting instructions.

Figure 2B:
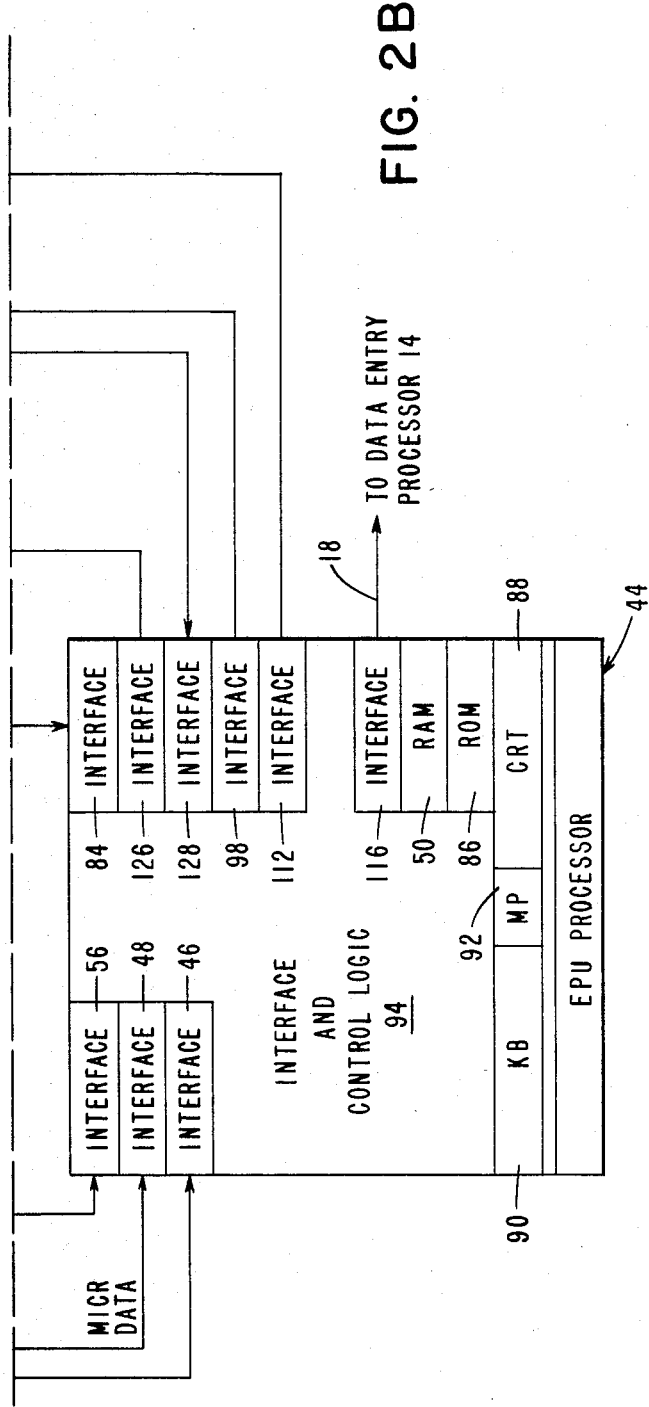

The EPU 12 is shown in more detail in FIGS. 2A and 2B, and has a general construction which is similar to a reader/sorter which is used to process documents such as checks and deposit slips, for example, in "batches" as previously described herein.

A batch of such documents is placed in a stacker or hopper 20 (FIG. 2A), and a conventional feed mechanism 22 is used to pick a document 24 from the hopper 20, and thereafter, a conventional transport mechanism 26 moves the document 24 along the document track 28 at a constant velocity and at a rate of 200 documents per minute in the embodiment described.

A conventional hand-drop, feed mechanism 30 (FIG. 2A) is provided to enable individual documents 24 to be fed manually into the document track 28, when, for example, a document 24 jumps out of the track 28 and has to be fed again into the document track 28.

Figure 5:
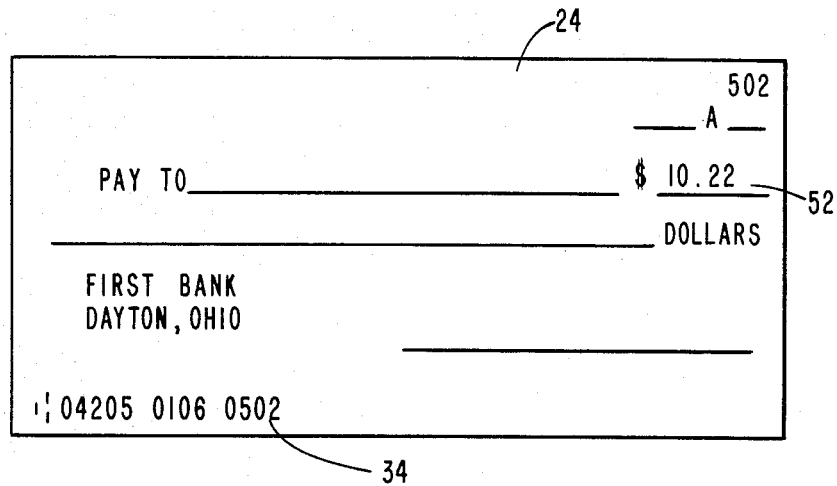
FIG. 5 shows an example of a document which is processed by the system shown in FIG. 1.

As each document 24 is moved along the track 28, it is brought into operative, reading relationship with a conventional, magnetic ink character recognition (MICR) reader 32. The MICR reader 32 is positioned along the track 28 so as to read the MICR line 34 (FIG. 5) on the document 24 as the document 24 is moved thereby. The MICR line 34 contains, for example, the identification of the associated bank number (transit routing number), customer's account number, check number, and other coding numbers which provide information as to the type of document i.e., whether it is a check, deposit slip, etc., the size of the document, where the courtesy or monetary amount is located, etc. The output of the MICR reader 32 is fed into conventional recognition circuitry 36 which interprets the data read.

There are sensors such as 38 and 40, for example, which are positioned along the track 28 (FIG. 2A) to check on the status of each of the documents as it is moved along the track 28. The sensors 38 and 40 are coupled to a conventional controller 42 which may include a microprocessor (not shown) to perform the routine tasks associated with moving documents along the track, such tasks as controlling the feed mechanism 22 and the transport mechanism 26, for example. The controller 42 is coupled to the EPU processor 44 (FIG. 2B) via the interface 46.

Continuing with the example being described, when the sensor 38 (FIG. 2A) indicates that a document 24 approaches the MICR reader 32, the EPU processor 44 receives this notification from the controller 42 as just described, and the EPU processor 44 assigns a document reference number (DRN) to the data associated with the document 24 to be read by the MICR reader 32. This DRN is unique for each document and will be used by the system 10 to identify the various data associated with a document 24 and to facilitate the processing of the documents in the system 10. The MICR data from the MICR reader 32 is processed by the recognition circuitry 36. Typical MICR data such as bank number, customer account number, and check number, for example, coming from the recognition circuitry 36 pass through the interface 48 to the random access memory (RAM) 50 of the EPU processor 44 where it is stored therein according to the now-available DRN.

The document 24 includes additional data on the MICR line 34 (FIG. 5) to facilitate the processing of documents within the system 10. This additional data, determined by the financial institution or bank which supplies the documents 24 and uses the system 10 may include, for example, a document-type number which indicates whether the document is a check, deposit slip, etc., a size number which indicates the physical size of the document; a courtesy amount recognition (C.A.R.) type number which indicates whether the courtesy or monetary amount on the document is machine printed or hand written; a location number which indicates the location on the document of the courtesy amount which is shown at 52 in FIG. 5; and the height of the document. This additional data is read by the recognition circuitry 36 and arranged or classified by the classifier circuitry 54 which forwards this additional data via the interface 56 to the RAM 50 where it is stored by the associated DRN. As of this moment in the process being explained, the DRN is not printed on the associated document 24.

After a document 24 is read by the MICR reader 32, it is moved into operative relationship with a conventional imaging device 58 (FIG. 2A) which is positioned along the document track 28.

Figure 6:
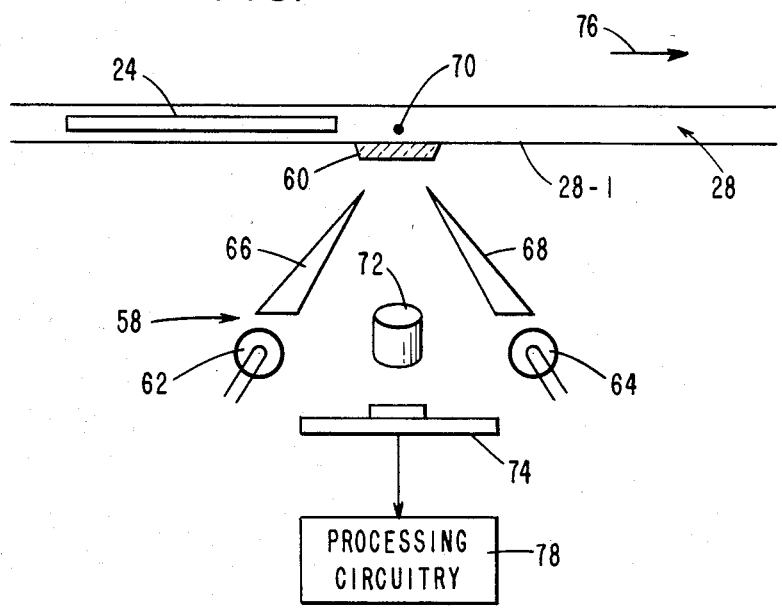
FIG. 6 is a plan view showing more details of the imaging device shown in FIG. 2A.

The imaging device 58 is shown in more detail in FIG. 6. The imaging device 58 includes a transparent, glass window 60 which is positioned on a sidewall 28-1 of the document track 28 to enable light from the light sources 62 and 64 to be directed by the associated light guides 66 and 68, respectively, on to a scanning line 70. The scanning line 70 is shown as a point in FIG. 6, which represents a top or plan view of the track 28, as does FIG. 2A. The top, long edge of the document 24 is viewed in FIG. 6, and in normal operation, the document is moved on its lower, long edge, with the front of the document 24 facing the imaging device 58 as it is moved thereby; the scanning line 70 in this environment is oriented in a vertical direction. As a document 24 is moved past the scanning line 70, the right-most edge of the document 24 (as viewed in FIG. 6) is illuminated by the sources of light 62 and 64, and light reflected therefrom through the window 60 is focused by a suitable lens system 72 on to the imaging sensor array 74. In the embodiment described, the array 74 may be of a type which produces a fixed number of picture elements or pixels along the scanning line 70. One such array 74, such as RL-1024B which is manufactured by Reticon Corporation, for example, produces 1024 pixels along the scanning line 70, although only 640 pixels are utilized to meet the resolution requirements of the embodiment described herein. As the document 24 is moved in the downstream direction shown by arrow 76, a new area of the document is presented to the scanning line 70 which produces a new set of 640 pixels therealong. Each pixel from the sensor array 74 has an associated analog, gray-scale value which is converted or digitized by the processing circuitry 78 to produce, for example, a six bit byte of data for each pixel, thereby recording 64 shades of gray ranging from white to black. The 64 shades of gray may be reduced, for example, to two shades, i.e., either black or white, by the processing circuitry 78. As the scans are completed, a stream of bytes or bits of data is issued from the processing circuitry 78. Because this aspect is conventional, it need not be described in any further detail.

The stream of data or pixels from the scanning line 70 (FIG. 6) of the "image" of a document 24 is further processed by having the output of the processing circuitry 78 fed into an enhancer 80 (FIG. 2A), whose output, in turn, is fed into a compressor 82. The enhancer 80 is conventional and is a circuit which is used to eliminate unnecessary background information and to make the pertinent data stand out from background information, for example. The compressor 82 is a conventional circuit which receives the enhanced data from the enhancer 80 and eliminates that data which is "meaningless" or "redundant" and thereby "compresses" the remaining data to produce compressed, digitized-image data which reduces the amount of transmission time necessary to transmit the data associated with an image of a document 24 and which also reduces memory storage requirements. The output of the compressor 82 is fed via a conventional interface 84 to the RAM 50 of the EPU processor 44, where this image data associated with a document 24 is stored temporarily by its associated DRN. As an optional feature, a second imaging device and associated circuitry (not shown) may be used to image the rear of a document 24 as described herein.

The EPU processor 44 (FIG. 2B) includes the interfaces 48, 56, and 84 already mentioned, a read only memory (ROM) 86, the RAM 50, a display such as a cathode ray tube (CRT) 88, a keyboard (KB) 90, a processor (MP) 92 and interface and control logic 94. The processing routines associated with the EPU processor 44 may reside in the ROM 86; however, the routines are loaded, more typically in the RAM 50 from disc or tape storage (not shown), for example, as part of a conventional start-up procedure. The CRT 88 is used to provide communication with an operator who uses the KB 90 to enter data or instructions. The interface and control logic 94 provides the interconnection among the various components of the processor 44 to enable it to function, conventionally, as an "intelligent" application processor. The form of the processor 44 shown in FIG. 2B is utilized to portray the various functions performed thereby, and the actual form of the processor 44 may be different.

Continuing with the movement of a document 24 along the document track 28, after a document 24 passes the imaging device 58 (FIG. 2A), it is moved into operative relationship with a conventional printer 96 which prints the DRN on the front of the associated document. The DRN was assigned earlier by the EPU processor 44 which transmits this DRN to the printer 96 via the interface 98. Various other conventional elements such as an endorser 100, microfilmer 102, and microfilmer 104 are positioned along the track 28 in operative relationship with each document 24 passing thereby. The endorser 100 may be used also to stamp a "logo" on the back of a document. The microfilmer 102 takes a picture of the front of a document for a permanent record, and similarly, microfilmer 104 takes a picture of the rear of a document. The endorser 100, and microfilmers 102 and 104 are optional and are shown as being coupled to the EPU processor 44 via the interface 98 along with the DRN printer 96.

Normally, the documents 24 are processed in a batch, as previously described, and after microfilming at microfilmers 102 and 104, they are diverted sequentially into a single pocket 106 by a diverter 108 which is controlled by a pocket controller 110 which is coupled to the EPU processor 44 via the interface 112. If the processor 44 wishes to single out one or more documents 24 (for various processing reasons) at this point, the processor 44 then sends out the appropriate instruction to the pocket controller 110 which causes the affected documents to be diverted into the reject pocket 114. As an optional feature, additional pockets like 106 may be provided to provide sorting capability to the EPU 12.

As the documents 24 are moved, sequentially, past the imaging device 58 (FIG. 2A), the associated image data is processed, enhanced, and compressed as previously described, and the compressed, image data for each document is buffered in the RAM 50. The DRN associated with the compressed image data is combined therewith, and this compressed, image data is immediately transferred out of the EPU processor 44 via its interface 116 over the network 18 to the DEP 14 (FIG. 3) via its interface 118. The DEP 14 then immediately transfers the compressed, image data via the interface 120 to an image disc file 122 where it is stored by the associated DRN. Because the documents 24 are processed in batches of about 200-300 per batch, for example, a batch header card may be used to identify each batch of documents being processed. The batch header card is the first document to be processed in the associated batch and a batch number associated with the header card may be used to identify the various document data associated with a batch of documents. In this regard, the compressed, image data in the image disc file 122 may be arranged by DRN within a batch number to facilitate the accessing thereof.

The image data derived from the imaging device 58 (FIG. 2A) is also utilized to perform machine character recognition to ascertain the courtesy amount on the documents 24 being processed. The image data coming from the enhancer 80 (prior to compression) is fed into a courtesy amount recognition (C.A.R.) module 124 where this function is performed. It also should be recalled that the classifier circuitry 54 provides certain data about each document, data such as document type, height, and size, location of the courtesy amount, and whether the courtesy amount is machine or handwritten, for example; for ease of discussion, this data shall be referred to hereinafter as C.A.R. type data.

The C.A.R. type data as developed was stored in the RAM 50 of the EPU processor 44 (FIG. 2A) along with the DRN which was assigned to the associated document 24. A sensor such as 40, positioned along the document track 28, produces a signal to indicate the start of data for the document 24 approaching the imaging device 58, and this signal is used by the processor 44 to forward the C.A.R. type data along with the DRN to the C.A.R. module 124 via the interface 126.

The C.A.R. module 124 (FIG. 2A) may be conventional and includes the necessary data buffers to store the data received and the processors and associated circuitry to effect character recognition. Some typical character recognition circuits and techniques are shown in U.S. Pat. Nos. 3,603,390; 3,629,829; 3,878,509; and 3,882,463. It should be recalled that the imaging device 58, in effect, produces a matrix of binary data with 640 pixels of data being included in each scan as the document 24 is moved past the imaging device 58. The C.A.R. type data is used by the C.A.R. module 124 to facilitate the location, for example, of the matrix of data associated with the courtesy amount. The C.A.R. module 124 then reads the courtesy amount using the image data received from the enhancer 80 and outputs the courtesy amount read to the EPU processor 44 via the interface 128 and stores the data momentarily in the RAM 50 by the DRN. For each individual number of the courtesy amount read, there is an associated number developed to indicate the confidence level associated with that number read. For example, a number 9 may be used to indicate a high probability of correctness of reading, while the number 1 may indicate a low probability of correctness. A low probability of correctness may be used in subsequent processing in the system 10 to facilitate the location of errors if errors develop in the usual reconciliation process. Naturally, a low probability of correctness of reading, or individual numbers of the monetary amount not being read at all would be tagged (with a 0, for example) to indicate the need for data completion at the DEP 14. The MICR data read from the recognition circuitry 36 and the courtesy amount along with the confidence level of each of the numbers in the courtesy amount are combined by DRN in the EPU processor 44. After combining, the data as completed is forwarded via the interface 116 over the network 18 to the DEP 14 via its interface 118, and thereafter, this data completed is transferred (via interface 131) and stored on a second storage or disc file 130 by DRN within the associated batch number in the embodiment described. This process is repeated for all the documents 24 in a batch of documents being processed.

The DEP 14 (FIG. 3) and its associated image display terminals (IDT) 14-1, 14-2, and 14-3, basically, effect further data completion and are used also for reconciliation and other banking operations. The DEP 14 may be similar to the EPU processor 44 and includes a KB 132, a processor MP 134 and a CRT 136 which function as previously explained, and the associated programs or instructions may be stored in the ROM 138 or the RAM 140, also, as previously explained. The interface and control logic 142 provides the interconnections among the various elements shown.

The IDTs 14-1, 14-2, and 14-3 (FIG. 3) are all basically alike except for certain operating instructions, and consequently, a detailed description of only IDT 14-1 will be given.

The IDT 14-1 (FIG. 3) may be conventional and includes a KB 144, MP 146, RAM 148, ROM 150, decompressor 152, interface 118-1, a CRT 156, and interface and control logic 158 which are all conventionally interconnected to enable the IDT 14-1 to function as what is considered an "intelligent" terminal. The IDT 14-1, in the embodiment described, is used primarily for courtesy amount entry by an operator; the IDT 14-2 is used primarily for correction of MICR data; and the IDT 14-3 is used for reconciliation procedures. Naturally, while the terminals 14-1, 14-2, and 14-3 are basically alike, their associated operating instructions (stored in the ROM 150 or RAM 148) are different to reflect the various general functions described. The decompressor 152 decompresses the compressed image data for a document (from the image disc file 122) to enable the image of the documents to be viewed on the CRT 156 to facilitate data completion.

As a first step in data completion at the DEP 14, the DEP 14 examines the data on the MICR disc file 130 for a batch of documents to determine which of the documents, if any, in that batch require further data completion. In this regard, the various tags indicating incomplete data or courtesy amounts having low confidence levels as previously described are used to access the data for each such document from the MICR disc file 130 via the interface 131. In one prior art, character-recognition technique, the confidence level takes the form of "recognition distances", for example. By this technique, a recognition distance close to zero means that the particular character read conforms to a matching "template" for that character. A large recognition distance means that the character read does not conform to one of the character templates anticipated. Continuing further, the corresponding image data from the image disc file 122 is selected by its DRN, and the image data and the data from MICR disc file 130 are forwarded to the appropriate IDT 14-1, 14-2, or 14-3, as previously described. For example, if the courtesy amount on a document 24 is missing, the image data from disc file 122 and the data from the disc file 130 are forwarded to the IDT 14-1 via the interface 18-1 of DEP 14 and interface 118-1 of IDT 14-1. The IDT 14-1 then decompresses the image data via the decompressor 152 and displays the image of the front of the document on the CRT 156. The operator then reads the courtesy amount from the image of the document 24 and enters the amount on the KB 144. Upon completion of the operation, the operator actuates a transfer key on the KB 144 to transfer the courtesy amount and other data completed to the DEP 14. The DEP 14 has process routines residing in the ROM 138 or RAM 140 which transfer the now-completed data for the document 24 into the MICR disc file 130 by DRN and the affected tags associated with the data are changed to reflect the completion of data. In general, data for more than one document 24 may be transferred from the DEP 14 to the IDT 14-1 where it is stored in the RAM 148 to facilitate the completion of data by the operator of the IDT 14-1 through such techniques as previewing, for example. In pre-viewing, the operator at a terminal like terminal 14-1 is provided with an image on the CRT 156 of the document being processed, and in addition, is provided with the image of the next document to be processed, to thereby enable the operator to "pre-view" it while the data for the document just completed is "put-away" or transferred to the appropriate destination. This process of obtaining the courtesy amount is repeated for all the documents 24 in a batch which are deficient in this respect.

The process of completing the MICR data derived from the MICR reader 32 in FIG. 2A is effected on the IDT 14-2 (FIG. 3) in a manner similar to that already explained with regard to completing the courtesy amount on the IDT 14-1. Because of the folding of documents or of dirt on the MICR line 34 of documents, for example, the MICR line of data for a document may have one or more characters or numbers missing. This data is completed on the IDT 14-2 by having the associated image data from the image disc file 122 and the associated data from MICR disc file 130 transferred from the DEP 14 to the IDT 14-2 via interfaces 18-2 and 118-2. The MICR data is completed by viewing the image data on the CRT 156-2 and by entering the data needed on the KB 144-2. The completed data for each document is then transferred to MICR disc file 130 to complete the data stored thereat. This process is repeated for each document 24 having incomplete MICR data in the associated batch.

After the courtesy amount data and MICR data are completed for a batch of documents and stored in the MICR disc file 130 (FIG. 3), typical reconciliation processes in which debits equal credits, for example, along with other banking operations are performed on the IDT 14-3. For example, if a batch of documents 24 includes only checks, a manual tally or total of the courtesy amounts of all the checks for that batch may be provided on the associated batch header card. Because the courtesy amounts for all the checks for this batch are present in the MICR disc file 130, an operator at IDT 14-3 may request, for example, that the DEP 14 perform the tally using the data in the file 130. If the tally generated for a batch of documents from the file 130 equals the total present on the associated batch header document, then the batch is in balance and no reconciliation is necessary. If these tally and total amounts differ, a reconciliation process is necessary to find the difference or error. In this regard an operator at the IDT 14-3 may request the image data from file 122 and the MICR data from file 130 for those documents which had low confidence levels for the courtesy amounts read from the C.A.R. module 124 (FIG. 2A). This data is forwarded from the DEP 14 to the IDT 14-3 via the interfaces 18-3 and 118-3 as previously described. The images for these checks are viewed on the CRT 156-3, and the operator makes data changes on the KB 144-3 for those errors found. The corrected data for the associated checks is transferred to the MICR disc file 130 and the reconciliation process is completed. Listings and other banking operations may be effected from the completed and corrected data in disc file 130.

To review, the DEP 14 and its associated terminals like 14-1, 14-2, and 14-3 are used to further complete the obtaining of data and to effect reconciliation on the batches of documents. The completed data from the MICR disc file 130 (FIG. 3) is transferred over the network 18 to the ESU 16 when the processing thereat is to performed. The interfaces 118-1, 118-2, and 118-3 for the IDTs 14-1, 14-2, and 14-3, respectively, are shown as being directly connected to interfaces within the DEP 14 to facilitate a showing thereof; however, in the embodiment described, the interfaces 118-1, 118-2, and 118-3 are coupled to the local area network 18 as shown in FIG. 1.

To summarize, batches of documents 24 are processed serially at the EPU 12, and further data completion is effected at the DEP 14. When a batch of documents 24 has its associated data completed and reconciled, for example, at the DEP 14, the physical documents 24 are moved to the ESU 16 where encoding the courtesy amount (in MICR ink), for example is effected, and the documents 24 are physically sorted according to the bank's predetermined criteria or sorting instructions.

Figure 4:
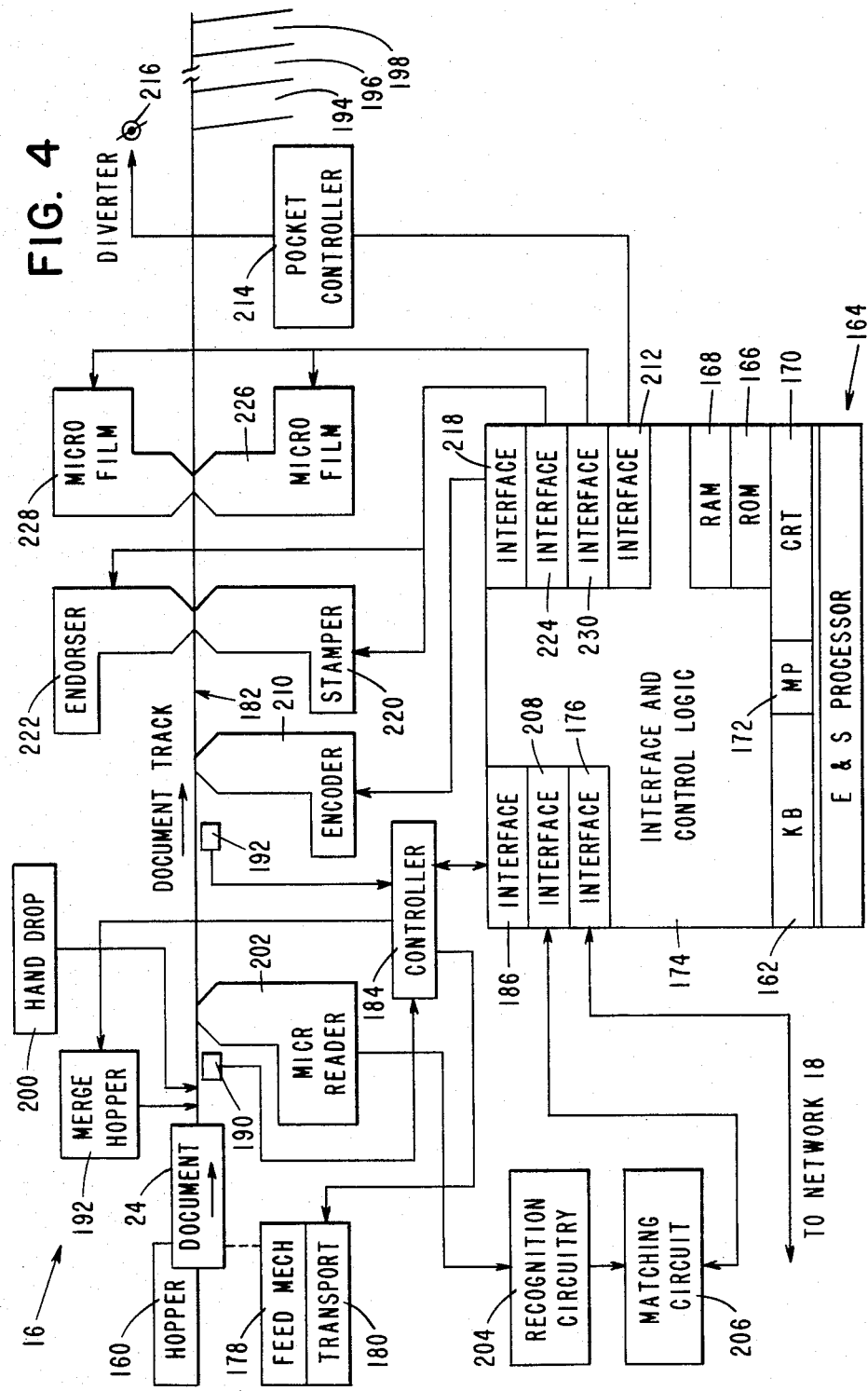
FIG. 4 is a schematic diagram, in block form, showing more details of the ESU shown in FIG. 1.

The ESU 16, shown in FIG. 1, is shown in more detail in FIG. 4. Much of the physical structure of the ESU 16 is similar to a conventional reader/sorter unit; consequently, a detailed description of the physical structure thereof is not deemed necessary.

A batch of documents to be processed, along with the associated batch header card, for example, are placed in the hopper 160 (FIG. 4). An operator at the ESU 16 then requests data for the associated batch of documents by entering, for example, the particular batch number of the KB 162 of an encode and sort (E&S) processor 164 which controls the overall operation of the ESU 16. Several batches may be included in a "run", as is typically done.

The E&S processor 164 (FIG. 4) has its operating instructions stored in either the ROM 166 or RAM 168, as previously described with the other processors herein. A CRT 170 is used to communicate with an operator, and a processor MP 172 is used to execute the operating instructions. Suitable interface and control logic 174 is used to interconnect the various elements described and the interfaces to be described to enable the E&S processor 164 to function as an intelligent terminal.

When an operator requests the completed data for a batch of documents 24 which are physically loaded in the hopper 160 (FIG. 4), the associated completed data which is stored in the MICR disc file 130 (FIG. 3) is transferred over the network 18 to the interface 176 of the E&S processor 164 to be stored in its RAM 168. The completed data for each document in a batch from file 130 appears in the same order as the corresponding documents 24 in the batch which is loaded in the hopper 160.

Processing at the ESU 16 is begun after the preparations discussed in the previous paragraph are made. In this regard, the first document 24 is picked from the hopper 160 by a conventional feed mechanism 178, and a conventional transport mechanism 180 moves the document 24 along the document track 182 at a constant velocity. The feed and transport mechanisms 178 and 180 are under the control of a conventional controller 184 which is interfaced with the E&S processor 164 by an interface 186. The controller 184 performs the usual operations of feeding and of checking on the progress of the documents 24 as they are moved along the track 182. Document sensors such as sensors 190 and 192, for example, which are operatively coupled to the controller 184, are used for this progress checking. A conventional merge hopper 192, under the control of the controller 184, is used to enable "document separators" to be automatically fed into the document track 182. These separators end up in the pockets like 194, 196, and 198 to provide for the separation of documents 24 within the pockets, with only a few pockets being shown in FIG. 4 to simplify the drawing. A conventional hand drop 200 is provided to enable an operator to manually load a document 24 into the track 182.

The ESU 16 (FIG. 4) also has a MICR reader 202, positioned along the track 182 to be in operative, reading relationship with the documents 24 as they are moved thereby. The reader 202 reads the MICR line 34 of data on the documents 24, and this line of data is interpreted by the conventional recognition circuitry 204. A conventional, matching circuit 206 receives the output of the recognition circuitry 204, and also receives (via interface 208) at least a portion of the "MICR data" for the first document which was stored in the RAM 168, and the circuit 206 makes a comparison of the data received. The documents 24 in the batch should be in the same order as they were in when processed at the EPU 12; however, this matching operation provides a way of detecting documents which are missing or out of order, for example.

As the matching operation is performed by the matching circuit 206, the associated document 24 is moved along the document track 182 and approaches the encoder 210. The encoder 210 is conventional, and in the embodiment described, it prints or encodes the courtesy amount, for example, for that document in MICR ink on the document itself when a match occurs at the matching circuit 206; this is the most typical situation. If a match does not occur, the E&S processor 164 will issue an appropriate signal (via its interface 212) to the pocket controller 214 which directs the diverting mechanism 216 to the divert the associated document 24 into pocket 194, which may be considered the reject pocket. When a match occurs, the appropriate data including the courtesy amount for a document 24 which was obtained from the MICR disc file 130 (FIG. 3) and stored in the RAM 168 (FIG. 4) is fed to the encoder 210, via interface 218 where the data is encoded on the document. The encoder 210 may have its own feed mechanism (not shown) associated therewith to enable the document 24 to be moved in printing relationship with the encoder 210; this is due to the fact that the feed rate effected by the transport mechanism 180 is generally different from that required by the encoder 210.

After the courtesy amount of the document 24 is encoded on the document itself, the document is moved further downstream along the document track 182 where a stamper 220 and an endorser 222 are used, conventionally, to stamp and endorse the documents according to customer specifications, with the appropriate data or controls therefor being supplied from the E&S processor 164 via the interface 224. Optional, conventional microfilming units 226 and 228, positioned along the document track 182, are used to microfilm, respectively, the front and back of a document 24. These units 226 and 228 are under the control of the E&S processor 164, and are coupled thereto via the interface 230.

The instructions for sorting the documents 24 into the pockets like 194, 196, and 198 reside in either the ROM 166 or the RAM 168 and are prepared according to predetermined criteria and customer's instructions. The data which is used for sorting the documents is that which was derived and stored in the MICR disc file 130 (and transferred to RAM 168) rather than that MICR data which was read by MICR reader 202 from the document itself. The process just described at the ESU 16 is repeated for each of the batches of documents to be processed as soon as the processing is completed at the DEP 14 as previously described.

I claim:

1. An apparatus for processing documents, comprising:
    a unit for reading machine-readable data including courtesy amount location data and for generating image data from said documents as said documents are moved along a track in operative relationship with said unit;
    said unit also including recognitin means receiving said image data and a portion of said machine-readable data including said courtesy amount location data to produce courtesy amount data along with confidence level data relative to said courtesy amount data for each said document; and
    control means operatively coupled to said recognition means for storing said machine-readable data, image data, courtesy amount data, and confidence level data by an identification number which is assigned thereto by said control means for each corresponding said document.

2. An apparatus for processing documents, comprising:
    a first unit for reading machine-readable data and for generating image data from said documents as said documents are moved along a track in operative relationship with said first unit;
    said first unit also including recognition means receiving said image data and a portion of said machine-readable data to produce recognition data along with confidence level data relative to said recognition data for each said document; and
    control means operatively coupled to said first unit for storing said machine-readable data, image data, recognition data, and confidence level data by an identification number which is assigned thereto by said control means for each corresponding said document;
    a second unit, comprising:
    a first storage means for receiving and storing said machine readable data, recognition data and confidence level data by the associated identification number as received from said first unit;
    a second storage means for receiving and storing said image data by the associated said identification number as received from said first unit;
    at least one terminal used for data completion and having a keyboard and a display; and
    second control means for examining said confidence level data in said first storage means for each said document to thereby select said machine-readable data, recognition data, and image data from said second storage means for a document having predetermined confidence level data and for transferring said data selected to said terminal to be displayed on said display to enable an operator to effect data completion on said keyboard.

3. The apparatus as claimed in claim 2 in which said machine-readable data is MICR data and in which said recognition data relates to at least the courtesy amount on each said document.

4. An apparatus for processing documents, comprising:
    reading means for reading MICR data from said documents;
    imaging means for generating image data from said documents;
    printing means for printing a unique document reference number, hereinafter called DRN, on each of said documents;
    transport means for moving said documents sequentially, in operative relationship with said reading means, said imaging means, and said printing means;
    recognition means for receiving said image data from said imaging means and also for recognizing predetermined data on said documents;
    control means including a memory for receiving said MICR data from said reading means and storing it in a first portion of said memory and also for assigning a said DRN to said MICR data, said control means also including means for receiving said image data and for storing it in a second portion of said memory and also for assigning the corresponding said DRN thereto;

interface means coupling said control means with said recognition means to transfer a portion of the corresponding said MICR data to said recognition means to assist said recognition means in recognizing said predetermined data; and said recognition means also providing confidence level data for said predetermined data which is transferred to said control means and stored in said first portion of memory by the corresponding said DRN.

5. The apparatus as claimed in claim 4 in which said imaging means produces uncompressed data which is forwarded to said recognition means and also includes compressor means for compressing said uncompressed data prior to its being stored in said second portion of said memory.

6. The apparatus as claimed in claim 5 in which said portion of the corresponding MICR data transferred to said recognition means relates to document type and size, and said predetermined data relates to the courtesy amount of the corresponding said document.

7. A method of processing documents comprising the steps of:
 (a) moving a document along a track;
 (b) reading machine-readable data from said document as it is moved along said track;
 (c) producing image data from said document as it is moved along said track;
 (d) utilizing a portion of said machine-readable data in conjunction with said image data to facilitate machine recognizing of predetermined data on said document and for producing confidence level data associated with said predetermined data;
 (e) assigning an identification number to said machine-readable data, image data, predetermined data and associated confidence level data for each associated said document, and storing all said data mentioned in this step according to the said identification number assigned to each corresponding said document.

8. The method as claimed in claim 7 further comprising the steps of:
 (f) examining the confidence level data from step e for each said document according to predetermined criteria and selecting said data mentioned in step e in accordance therewith;
 (g) using the data selected in step f to manually complete said predetermined data for the corresponding said document to produce complete predetermined data therefor.

9. The method as claimed in claim 8 in which said complete predetermined data includes at least the courtesy amount of a document and in which said method further comprises the step of:
 (b) printing in MICR ink, at least the courtesy amount of a said document on the document itself.

10. The method as claimed in claim 9 in which said reading step is effected by reading MICR data from each said document.

* * * * *